(12) United States Patent
Tobin et al.

(10) Patent No.: US 8,719,243 B2
(45) Date of Patent: May 6, 2014

(54) METHODS AND SYSTEMS FOR FILTERING DATA FOR INTERACTIVE DISPLAY OF DATABASE DATA

(75) Inventors: Thomas J. Tobin, San Francisco, CA (US); Ceren Sakizli, San Francisco, CA (US); Anshu Agarwal, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 175 days.

(21) Appl. No.: 13/095,788

(22) Filed: Apr. 27, 2011

(65) Prior Publication Data

US 2011/0264650 A1 Oct. 27, 2011

Related U.S. Application Data

(60) Provisional application No. 61/328,513, filed on Apr. 27, 2010.

(51) Int. Cl.
*G06F 17/30* (2006.01)
*G06F 7/00* (2006.01)

(52) U.S. Cl.
USPC ............. 707/705; 707/722; 707/723; 706/16; 706/17; 706/18

(58) Field of Classification Search
None
See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,568 B1 | 11/2001 | Diec | |
| 6,324,693 B1 | 11/2001 | Brodersen et al. | |
| 6,336,137 B1 | 1/2002 | Lee et al. | |
| D454,139 S | 3/2002 | Feldcamp | |
| 6,367,077 B1 | 4/2002 | Brodersen et al. | |

(Continued)

*Primary Examiner* — Angelica Ruiz
(74) *Attorney, Agent, or Firm* — Blakely, Sokoloff, Taylor & Zafman

(57) ABSTRACT

Interactive database viewing is provided. A server associated with a database accesses a stored result set from a database query. The server presents a portion of the result set in a list view to a client device remote from the server and the cache memory, where the portion presented is based on filter selection based on fields of the data. In response to changes to the filter selection, the server can dynamically alter the list view without having to again access the database. If a change to the filter selection requests data outside the cached result set, the server accesses the database and updates the cached result set. Inline editing of the data in the list view can be applied back to the database by the server.

20 Claims, 11 Drawing Sheets

(56) References Cited

U.S. PATENT DOCUMENTS

| | | |
|---|---|---|
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,043,727 B2 * | 5/2006 | Bennett et al. ............... 718/100 |
| 7,340,411 B2 | 3/2008 | Cook |
| 7,353,235 B2 * | 4/2008 | Sally et al. ............... 1/1 |
| 7,620,655 B2 | 11/2009 | Larsson et al. |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0097121 A1 * | 5/2005 | Sally et al. ............... 707/102 |
| 2006/0129638 A1 * | 6/2006 | Deakin ............... 709/203 |
| 2007/0027887 A1 * | 2/2007 | Baldwin ............... 707/100 |
| 2007/0038610 A1 * | 2/2007 | Omoigui ............... 707/3 |
| 2008/0051989 A1 * | 2/2008 | Welsh ............... 701/208 |
| 2008/0183702 A1 * | 7/2008 | Sally et al. ............... 707/5 |
| 2010/0318745 A1 * | 12/2010 | Wheeler et al. ............... 711/136 |

* cited by examiner

METHODS AND SYSTEMS FOR FILTERING DATA FOR INTERACTIVE DISPLAY OF DATABASE DATA

RELATED CASES

This application claims the benefit of priority of U.S. Provisional Patent Application No. 61/328,513, filed Apr. 27, 2010.

FIELD

Embodiments described are related generally to database management, and embodiments described are more particularly related to filtering data for interactive displays of database data.

COPYRIGHT NOTICE/PERMISSION

Portions of the disclosure of this patent document may contain material that is subject to copyright protection. The copyright owner has no objection to the reproduction by anyone of the patent document or the patent disclosure as it appears in the Patent and Trademark Office patent file or records, but otherwise reserves all copyright rights whatsoever. The copyright notice applies to all data as described below, and in the accompanying drawings hereto, as well as to any software described below: Copyright © 2011, Salesforce.com Inc., All Rights Reserved.

BACKGROUND

In many conventional database systems, users access their data resources in one logical database, from a user's own systems. Access to a database consumes system resources, as the database system must process and respond to requests as well as accessing storage to read and/or write data. Access to remote databases is much more costly in terms of resource use, given that in addition to the database access described above, there is also network bandwidth consumed. If a user is viewing multiple pages of data from a database, changes to what is being viewed traditionally involve another database request, including accessing the database again. Thus, viewing a lot of data can result in a significant load on the database and/or network systems as multiple requests are made to change views on the data.

Additionally, it has been observed by the inventors that users who want to view a lot of database data typically want to work on classes of things presented in the data. However, traditional database access mechanisms for filtering the data for viewing works on a row or item level, rather than allowing access to classes. Thus, remote access to multiple rows of data for viewing can cause a significant burden on the performance of a database system, with accompanying slow performance from a user perspective.

BRIEF DESCRIPTION OF THE DRAWINGS

The following description includes discussion of figures having illustrations given by way of example of implementations of embodiments described. The drawings should be understood by way of example, and not by way of limitation. As used herein, references to one or more "embodiments" are to be understood as describing a particular feature, structure, or characteristic included in at least one implementation. Thus, phrases such as "in one embodiment" or "in an alternate embodiment" appearing herein describe various embodiments and implementations, and do not necessarily all refer to the same embodiment. However, they are also not necessarily mutually exclusive.

Figure 1:
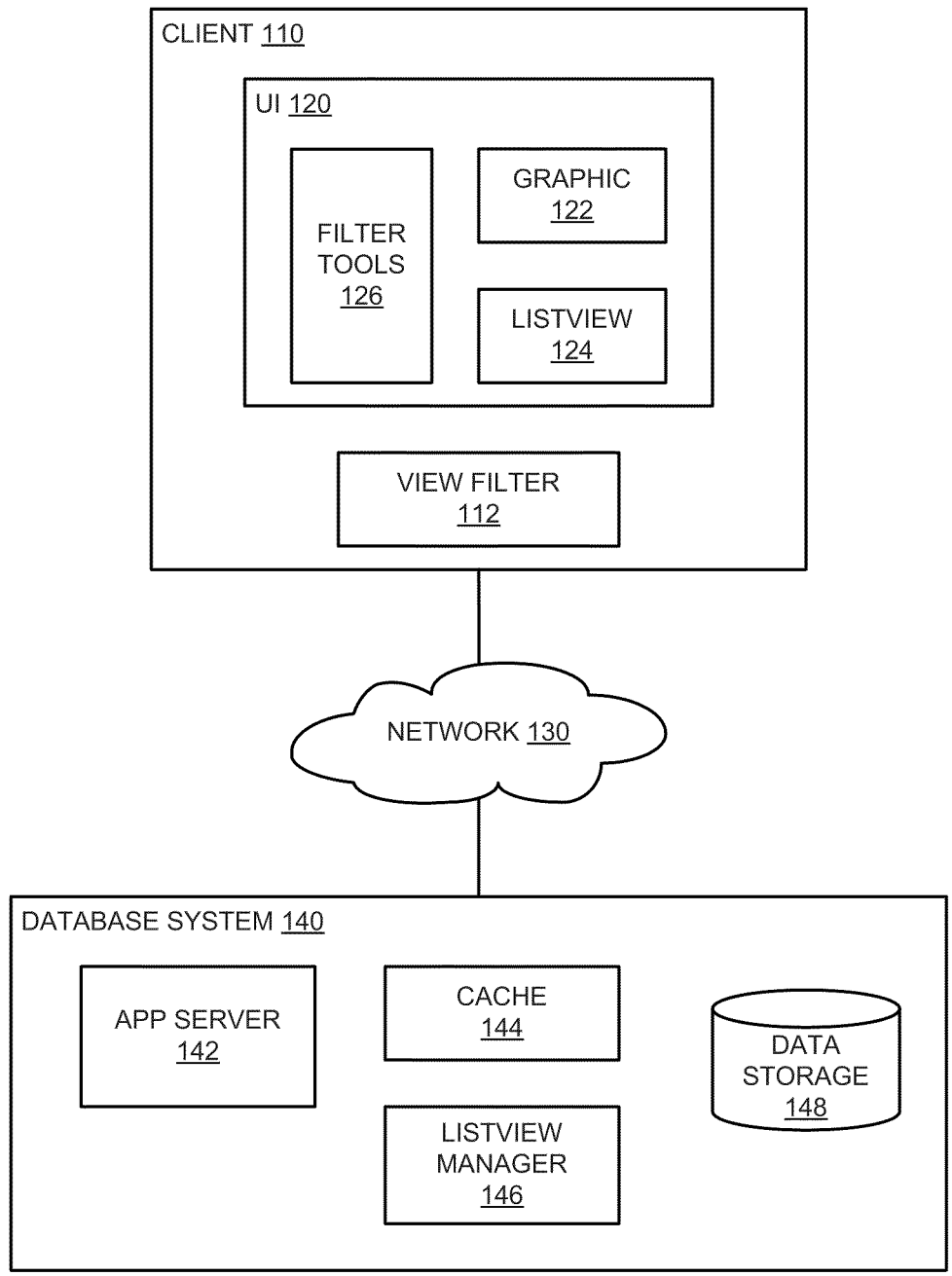
FIG. 1 is a block diagram of an embodiment of remote database access with a view filter in the client and a list view manager at the database.

Descriptions of certain details and implementations follow, including a description of the figures, which may depict some or all of the embodiments described below, as well as discussing other potential embodiments or implementations of the inventive concepts presented herein. An overview is provided below, followed by a more detailed description with reference to the drawings.

DETAILED DESCRIPTION

As described herein, interactive filtering of database view is provided. A client device includes a data filter agent that enables interactive components of a view of data from a remote database. A server associated with the database accesses the database in response to a query and caches a result set based on the database access. The server provides the result set to the client device. A user of the client device can change what is viewed and what filters to apply to the data for viewing. Based on the changes by the user, the server can generate and provide new views on the data by accesses the cached data, rather than having to again access the database to respond to view changes. If the changes to the view relate to data not cached, the server will access the database again and update the cached data, and provide the requested view to the client.

Thus, the server can access the database only as needed to respond to the changes, which preserves processing resources and resources related to access to the storage of the database. Additionally, as provided herein, the filters and filtering of the data allows a user to act on classes of things presented in the data. Interactive resources allow a user to change views on data in accordance with classes or common types of data. Thus, a user has access to data based on type, because of filter and interactive filtering options. The interactive filtering is described in more detail below. In one embodiment, inline editing is provided for the user to make changes to the data, which are updated into the database. Thus, the user can view and act on data based on any of a variety of filtering options.

Traditionally, data from a database query has been presented in a list or list view (often written as "listview" in the art). Data from databases is typically formatted or organized by field. The fact that one field or query key may generate a result does not necessarily mean the user is interested in the data. Thus, users would often benefit from further filtering based on other fields of the data (which are generally provided as columns in rows of data results in a list view). As provided by a list view manager at the database server that provides the data views, the data presented can be interactive and update automatically in response to changes in requests. The update can occur within the same view of the data, but be organized or filtered in accordance with an interactive selection by the user.

Thus, lists of data to provide in a list view are built on the fly, which allows automatic updating in response to changes. In addition to a list of data that may be interacted with, in one embodiment, a graphic representation or chart of the data list is provided. The graphic is interactive to allow the user to make filter or view selection from interacting with the graphic representation. Thus, a chart or graphic can provide a big picture view of the list of data, which the user can then drill into to see details about individual items of data in the list. For example, a chart may be displayed representing all data results of the query, which show up in a scrollable list. The user can drill into something on the chart with cursor selections and/or buttons or tools from a user interface component or drop-down box. In response to the change, the list can be automatically updated to show only the specific list items interacted with in the chart. Thus, a user can click on a chart to update a list view.

In one embodiment, filter tool widgets (e.g., user interface buttons, sliders, boxes, drop-downs, popups, or other user interface components) are provided to allow a user to filter the data. The filters may put bounds on the initial queries, and changes to the filters can further refine the results provided, or a new query can be made. Filters may include restrictions on fields of the data (e.g., a date field that falls within a specified range, or a dollar amount field that is over a certain threshold). Changes by a user to the filters may indicate that data outside the range of the original query, which produced results cached by the server. Thus, in response to a change of filters, the server may automatically update the query results, and cache the updated results to use for further interaction and view filtering as described. In one embodiment, both filter tools and a graphic are provided.

Thus, as will be understood, views can be changed within a particular screen on a client device, and a user does not have to juggle multiple screens or multiple tabs to access or edit data. Additionally, a user does not need special training or experience to know how to create filters. Traditionally, filters were applied only to database queries, and a user needed to know how to provide the desired filters. For example, a user may have needed to know a sequence of commands or characters to use to apply a filter. Instead, a user can filter and update results data from an interactive screen as provided herein.

As described above, a server at the database caches results data, for example, in a cache memory (such as resources for a memcache of the database system). The database includes the hardware storage resources, and software components that execute on processing resources to enable access to the data. A database may be considered a structured approach to storing and accessing data stored in storage resources. There are many different implementations of a database, and the specific implementation is not relevant to the discussion of filtering here. The database system includes the storage and processing resources, including interface hardware and software (such as physical network connections, network protocol stacks, security elements, and other components for interfacing with the stored data).

The database system includes one or more servers to process requests and provide access to the data. As described herein, the server caches results, and presents at least a portion of those results in a list view to a client device remote from the database. As used herein, a client device is remote from a database or remote from a database system when the client device does not share processing or memory resources with the database system. Thus, the client device executes on processing and memory resources not shared with, for example, the server that allows access to the database. Such a client device can be said to be "separate" from the database rather than "remote", but either term is understood to mean that the client device accesses the database as an outside system. Typically, a remote client device accesses the database system over a network connection.

The server caches results data in a memory local to the server, and remote or separate from the client device. It will be understood, therefore, that the server does not simply send result to the client device for manipulation by the client device. Rather, the server stores the results and provides views on that data, and updates the views provided (or served or hosted) in response to interaction at the client device. The portion of the results set presented by the server is based at least in part on the filters selected by a user, or defaulted for a user. The updates are made based on the results set unless the filtering covers data outside the results set, in which case the server can again access the database.

In one embodiment, a user setting, a filter, or a rule is applied by the server to limit a number of rows of results data cached. The rule can be a system rule (e.g., a limit on cache use) or a rule for a particular user or user group. In one embodiment, the server accesses a metadata description that defines a mapping between columns of a row of data, and fields of data stored in the database. Thus, presentation of data in the list view may include accessing metadata to determine what to present in the list view.

In one embodiment, the database is a multitenant database. As referred to herein, a multitenant database stores data for multiple client organizations, which are each identified by a tenant ID. One or more users can be associated with each tenant ID. The one or more users of each client organization access data identified by the tenant ID associated with the respective client organization. The multitenant database is typically a database stored and hosted remote from the client organization. Typically, the multitenant database is hosted by an entity (e.g., company) separate from the client organization. A multitenant database system (MTS) as described herein can be said to provide on-demand database services. An MTS is typically a hosted system that provides as much database storage and service as required by each tenant.

In an MTS implementation, the server may store the results set in a shared memcache of the multitenant database, shared among multiple application servers. In such a use of shared memory resources, the server may apply a timeout to the stored data to prevent the cached result set from consuming an excessive amount of resources of the multitenant database. Thus, if the results are not explicitly closed or removed, the results may be removed by garbage collection after a certain amount of time after the last access.

FIG. 1 is a block diagram of an embodiment of remote database access with a view filter in the client and a list view manager at the database. System 100 represents an environment in which remote database access is provided with interactive filtering as described herein. Client 110 represents any type of user device or client device, such as any type of computing device, through which a user client access database system 140. Client 110 access database system 140 over network 130.

Database system 140 is illustrated as including application (app) server 142, cache 144, listview manager 146, and data storage 148. It will be understood that database system 140 could include more components than what are illustrated. The specific components identified relate to providing a view that supports interactive filtering of data, but other components not shown could also be included to support such capability.

Application server 142 represents a server of the database system, and is the server that receives and processes queries from client 110. It will be understood that application server 142 could be one of many (e.g., a pool or a coordinated group) of application servers. Application server 142 stores results in cache 144, which represents memory space available to application server 142 in database system 140. Cache 144 may be dedicated to server 142, or more commonly, will be shared among multiple servers in database system 140.

Data storage 148 represents the database or the data of the database of database system 140. Database system 140 could implement a relational model, object oriented model, or an object-relational model for data storage 148. In one embodiment, data storage 148 includes metadata that describes data elements stored in data storage 148. Thus, there may be metadata available to describe fields of the data.

Listview manager 146 represents one or more components of database system 140 that builds and manages views provided to client 110. Building the view includes accessing data from data storage 148 and applying filters to the results. Listview manager 146 generates a model of the data for the presentation of the view to client 110, the model being a structure defining how the data is presented on a user interface. The model may include definitions of interactions supported by the view. In one embodiment, listview manager 146 builds a model of business by the database fields and metadata associated with the data. Thus, listview manager 146 receives query results from application server 142, and populates a view to present to client 110. The view may be generic to any type of data. Thus, any data type can be supported in providing the view. In one embodiment, listview manager 146 is part of application server 142, or alternatively, listview manager 146 is a program or process that executes in a process space of application server 142.

In one embodiment, client 110 includes view filter 112, which represents mechanisms on the client device related to enabling an interactive view to the client. In one embodiment, filter 112 is provided by logic associated with the view as provided by server 142. For example, server 142 may provide a webpage to client 110, which includes logic related to filtering data on the webpage.

UI (user interface) 120 represents components associated with providing an interactive view on client 110. UI 120 could be rendered, for example, in a web browser, or a database client application. UI 120 includes listview 124, which represents a list of data elements provided in response to a database query. In one embodiment, the columns of listview 124 correspond to fields of data as determined from metadata in the database. In one embodiment, UI 120 includes graphic 122, which represents any kind of table, graph, or chart to graphically illustrate the data of listview 124. In one embodiment, graphic 122 is created from two selected fields of data in listview 124.

If included, graphic 122 allows a user to filter data for the view by interaction with graphic 122. Thus, UI 120 can have both a picture and a list, and allow the picture to act as a filter for the data, with inline editing possible from with listview 124. In such an implementation, the user could simply use graphic 122 to filter data, which is different than known websites that provide pictures to view catalogs of available products.

In one embodiment, UI 120 includes filter tools 126, which includes one or more filters that correspond to the model of the data presented in listview 124. Filter tools 126 allow a user to modify views without specifically performing an "edit" operation. Thus, listview manager 146 builds a model of the data for presentation, and populates the data, which can then be filtered by filters that correspond to one or more of the fields defined in the model built by listview manager 146.

Listview manager 146 receives indications from client 110 of what interactions are performed by the user with the view to change one or more filters of filter tools 126. The user can interact with graphic 122 and/or with the data in listview 124. Interaction with filter tools 126 could generate a new query to go back to the database. In the case that a new query is generated, listview manager 146 would reissue the results and regenerate listview 124 (as well as graphic 122 in an implementation where it is included).

While specific reference is made above to system 100, in general, as implemented herein, an interactive view of data is provided, where changes can be made to refresh the view and/or apply changes to the database.

In one embodiment, the view is referred to as an OLVC (Opportunity Listview Console). Generally, an interactive list view can allow a user to limit his or her attention and focus on a sub-set of the data (e.g., deals for a salesperson) under the view, allow in-line editing to keep a list of data up-to-date, and provide users a more near-real-time interactive experience with the database. In one embodiment, the list view data is provided without pagination to allow easier visibility and access. Graphic presentation provides an aggregate view of filtered data, as well as providing the ability to filter again by interacting with the graphic.

In one embodiment, the manager of the views (e.g., listview manager 146) can convert existing list views into interactive list views, with customizations of fields and filters, and the potential of adding filter tools and graphics. The dynamic and on-the-fly generated interactive list views as described allow a user access to data that may otherwise be difficult or impossible to achieve through the use of existing reports or view forms, as conventionally done with database access.

In one embodiment, the dynamic list view is configurable. In one embodiment, the dynamic list view can be an alternative view to a traditional "static" view, which does not include the features of on-the-fly generation or interactive filtering. Thus, dynamic list view can be enabled and disabled on an organization basis (client of the database), or on the basis of individual users. In one embodiment, a particular view template is generated and used for all users associated with a particular client organization. In other embodiments, view templates can be created by role or individual.

As mentioned above, a graphic and/or filter tools may be included in a particular view. In one embodiment, each of these features is individually enabled or disabled. In one embodiment, configuration of a view is personal to a user, who can save a particular configuration for default use. For example, a user could swap x- and y-axes on a selected chart. In one embodiment, multiple charts can be displayed side-by-side.

In addition to being able to enable or disable the filter tools, the specific filters included can be edited. Similarly, the graphic can be individually configured as to what is shown. In one embodiment, the graphic is selected from one of the following chart types: horizontal bar chart (which may further be grouped, stacked, or stacked to 100%), vertical column chart (which may further be grouped, stacked, or stacked to 100%), line chart (which may further be grouped, cumulative, or grouped cumulative), pie chart, donut chart, or funnel chart.

In one embodiment, the view is configurable, enabling a user to set which fields to view, and which order to show them. The data can be sorted in accordance with any logical ordering that makes sense for the data fields (e.g., by value for numeric fields, by date for date fields, alphabetically for text fields). In one embodiment, in addition to the automatic refreshing of data based on changing filters, the user can manually refresh the data on the list view.

In one embodiment, a server (for example, via a listview manager) can generate every view with links for filters and graphics, even if they are not enabled or are not specified for a specific view. Thus, the links exist to easily integrate them into a view. A user can also set up an initial view, such as by tools in drop-down menus or other control panel or control items. Once an interactive view with filtering is enabled, a filter panel can be provided based on the link. Additionally, a graphic can be provided once enabled.

In one embodiment, a user may have available multiple different views. Thus, a header on a view can provide an area for the user to select from among multiple different views. Additionally, a user may be able to manage the views, such as changing and saving configuration for a particular view, or creating a new view. Different views can be labeled or named for separate identification.

In one embodiment, a graphic can indicate when it was last refreshed (e.g., a specific time), or how long it has been since it has been refreshed (e.g., an amount of time). For example, a user may be able to see when the graphic was last refreshed by mousing over the graphic, or selection an action from a menu.

In one embodiment, a user can specifically request the data in a particular view to be refreshed. A refresh of the view in that sense can be understood to go back to the database to update the data. Other times the database may be accessed again include any type of cache miss on the cached result set. Cache misses may typically occur when a user extends fitters to show more data than is present in the cached result set, or when a user adds a field to the requested data, or when the user sorts when the cached set of data is complete.

As suggested above, the filter tools allow for dynamic filtering. Thus, a user can change the filters on the fly. After a filter change, it may be expected that a cache miss will result, which will cause a refresh of data in the list view.

Figure 2A:
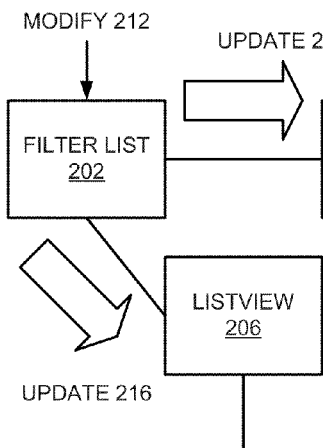
FIGS. 2A-2C are block diagrams illustrating embodiments of view filtering based on multiple interactive user interface elements.
Figure 2B:
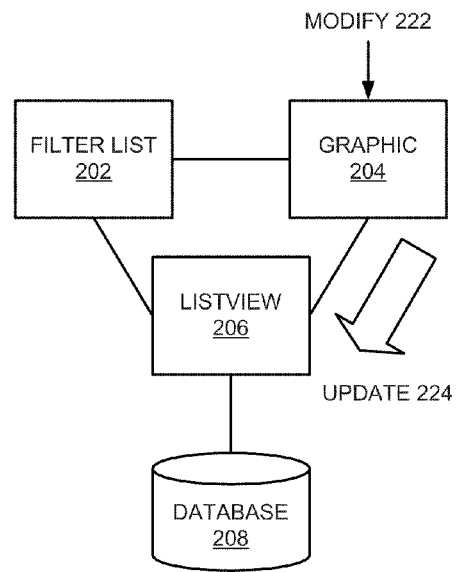
Figure 2C:
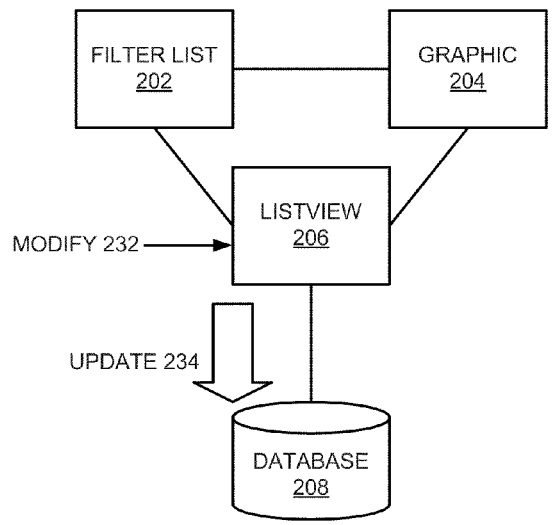

FIGS. 2A-2C are block diagrams illustrating embodiments of view filtering based on multiple interactive user interface elements. These figures illustrate various potential dependencies, in one embodiment. FIG. 2A illustrates a dependency relationship between the filter list 202 and graphic 204 and listview 206. If a user interacts with filter list 202 to modify 212 something in the filters, the system my automatically create update 214 for graphic 204 and update 216 for listview 206. The update will include additional information coming from database 208. While there is only a connection shown between database 208 and listview 206 (and not to graphic 204 or filter list 202), it will be understood that update data comes from database 208, either from cached data or from a new query as discussed above.

FIG. 2B illustrates a dependency relationship between graphic 204 and listview 206. If a user interacts with graphic 204 to modify 222, update 224 is generated by the system to update listview 206. FIG. 2C illustrates a dependency relationship between database 208 and listview 206. More specifically, modify 232 could be understood as an inline edit of data in listview 206, which is then propagated back to database 208 as update 234.

Thus, changes to filters change the graphic, changes to the graphic change the list, and changes to the list change the database. It will be understood that in one embodiment, changes in the graphic do not cause changes in the filter list.

FIGS. 3A-3E illustrate embodiments of screenshots of view filtering based on multiple interactive user interface elements for remote database access. The following screenshots can be understood as one example flow of use of the system to implement the changes illustrated in the screenshots. All content is to be understood as merely providing examples, and differences may exist in layout and content in different implementations.

In the screenshot examples, the views are accessed via a UI 300, which could be, for example, a browser or other client application. As illustrated, UI 300 is a browser that accesses a data view via address 302, which is a network address that allows the client device remote access to the database. UI 300 includes toolbar area 304, which is understood to include one or more toolbars as is commonly known in the art. Toolbar area 304 may include buttons or drop-down menus or other tools to enable a user to interact with the view shown in UI 300 and modify and/or save a view or elements of the view.

Figure 3A:
FIGS. 3A-3E illustrate embodiments of screenshots of view filtering based on multiple interactive user interface elements for remote database access.

As mentioned above, a view includes a list view. Referring to FIG. 3A, the view in UI 300 is illustrated with list view 320. In one embodiment, a graphic can be shown and/or a filter list. UI 300 is illustrated with graphic 310 and filter list 330. Graphic 310 is a chart with "Amount" and "Close Date" as its axes, which are fields from list view 320. The logic for rendering graphic 310 is included in the database server.

It will be understood that an initial view will come up, which can be manipulated by changes parameters of the filters (i.e., interactive filtering). In one embodiment, certain defaults are included for data; for example, data that includes a date range, may default to bounds based on the user such as transactions going back one year if the user started one year ago. The system first performs a general query with default or applied fitters as bounds, and caches the results to prevent having to hit the database again. A limited row set (e.g., 500 rows) is provided by the system to UI 300, and the user filters based on that data. Thus, for example, list view 320 may include 500 rows of non-paginated data that can be scrolled through.

Figure 3B:

Referring to FIG. 3B, one of the elements on graphic 310 is highlighted. The highlighted may be generated, for example, in response to a cursor click, or a mouse-over. While the bar for date Jun. 26, 2010 was visible the whole time on graphic 310, additional information is provided when selecting the bar. Thus, the specific dollar amount ($312000) is illustrated along with the percentage of the total (%14) and an indication to click to filter the list in accordance with the specific graphic element.

Figure 3C:
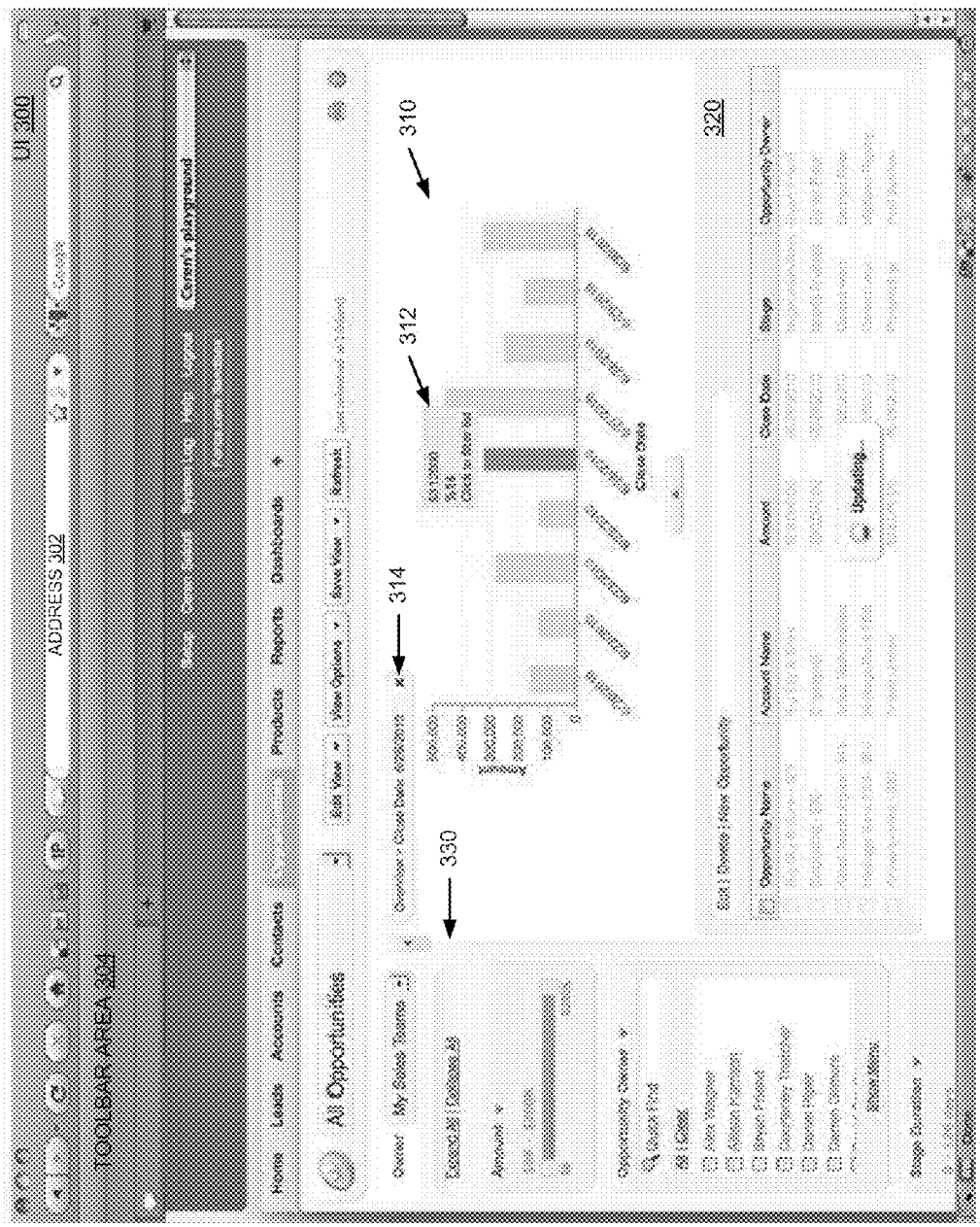

As illustrated, Close Date column 322 of list view 320 includes dates within a whole range as illustrated in graphic 310. However, if the user clicks on the bar element for Jun. 26, 2010, the view changes to FIG. 3C. As shown, bar 312 can be made to stand out further (e.g., by converting the color scheme of graphic 310), and list view 320 is automatically updated. An "updating . . . " icon is shown in FIG. 3C, as may be presented while the system updates the view, and determines if the information needed for the updated filtered view is all within the cached data at the server. In one embodiment, drill-down control 314 is provided on-screen to allow the user to "close out" the drilled-down view to return to the previous view. Thus, the system can receive a request for filtering from the user via interactive graphic 310.

Figure 3D:
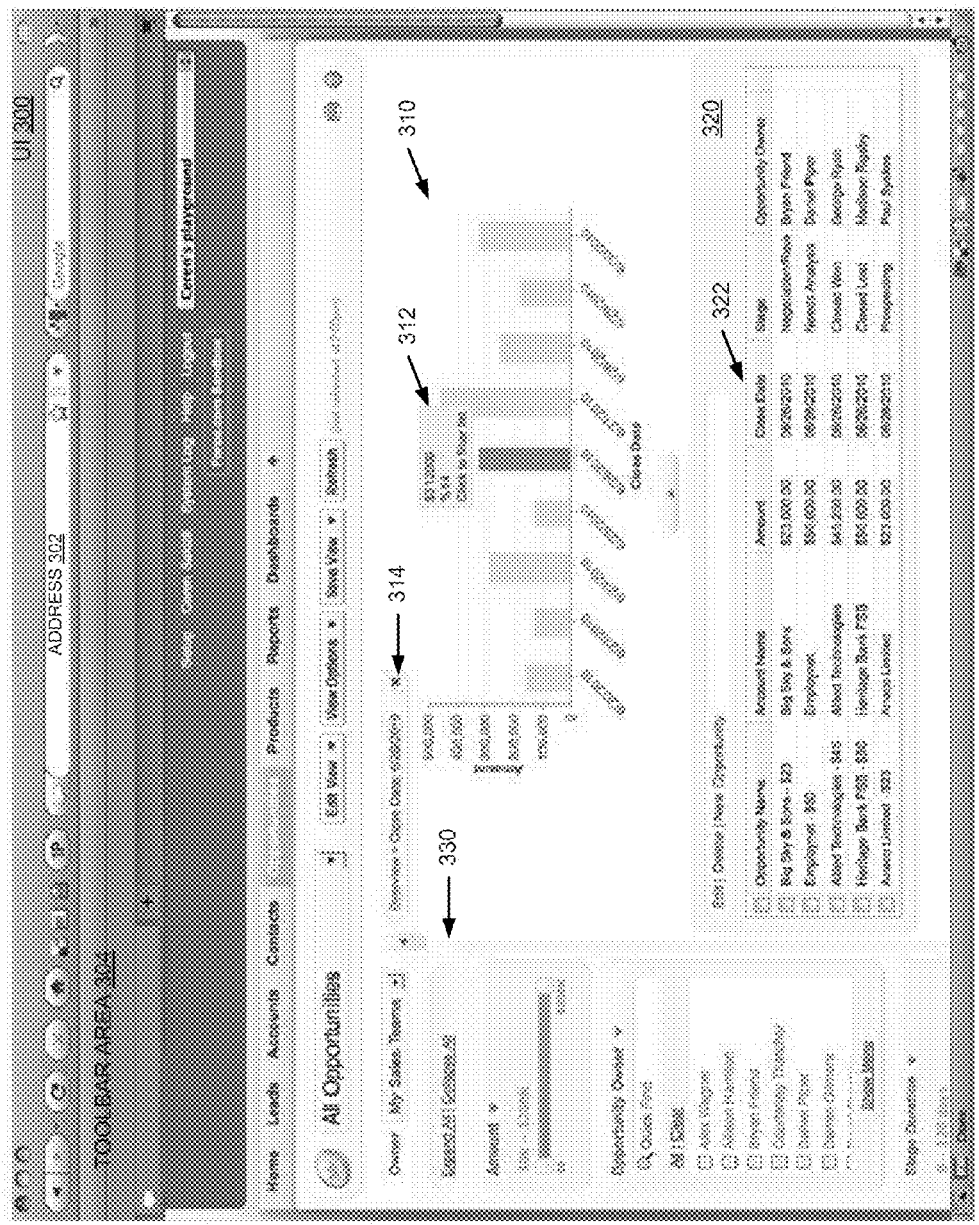

Referring to FIG. 3D, list view 320 is shown updated, and by looking at Close Date column 322 it can be seen that all data elements in list view 320 have a close date of Jun. 26, 2010. Thus, the view has been filtered and automatically updated simply by a user clicking on element 312 of graphic 310. The user did not have to open a different tab and put in date restrictions to see the drilled down data. Additionally, the user can simply click on element 314 to return to a higher-level view within the same viewing space.

Figure 3E:
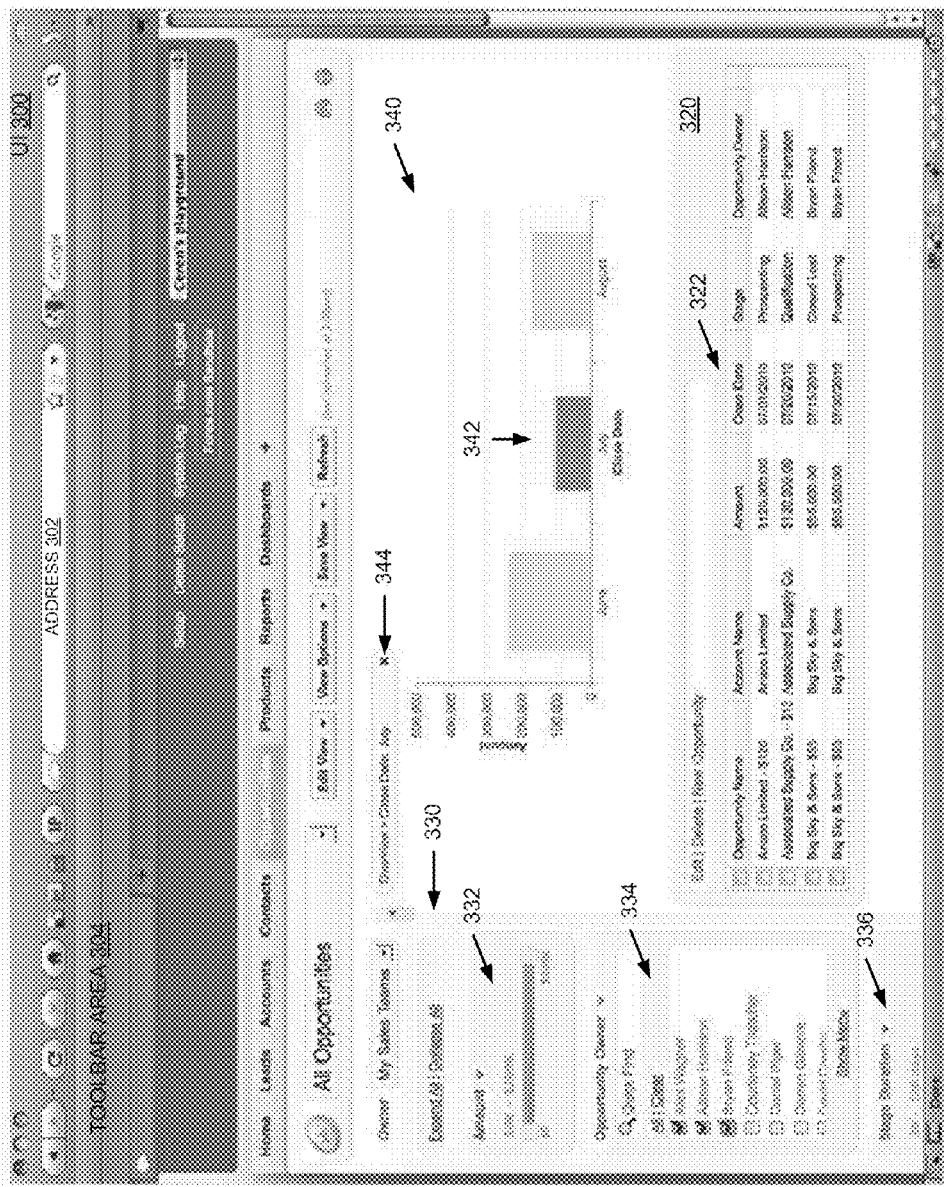

Referring now to FIG. 3E, a different view of data related to the same user is shown. Graphic 310 of the previous views has been replaced by graphic 340, which illustrates an even higher level view of the data than was seen in graphic 310. Whereas graphic 310 was a bar graph showing close date by day versus amount for the last 10 days of June, graphic 340 is a bar graph showing close date by month versus amount for June, July, and August. Element 342 on graphic 340 is selected, corresponding to close dates in July. Thus, list view 320 shows a filtered data set of only data elements having Close Date 322 in July. The view in FIG. 3E can be understood to be a drilled-down view, because drill-down control 344 is on screen.

FIG. 3E also illustrates filter list 330. Three examples of fitters are shown, corresponding to the data in list view 320. It will be observed that corresponding columns are found in the data elements of list view 320. Thus, filter 332 allows a user to filter data for a specific dollar Amount. Filter 334 allows a user to filter data for one or more Opportunity Owners. As shown, three names are selected; once applied, data having any of those individuals as Opportunity Owner will be retrieved from the database, and the cached result set will be updated accordingly.

Filter 336 allows a user to filter data by Stage Duration. It will be observed that Stage Duration is a column of data elements of list view 320. Thus, it can be assumed that the information regarding Stage Duration exists within the database, but the configuration of the view of UI 300 does not currently include Stage Duration as a column in list view 320. The column could be added with configuration tools. Additionally, the fact that the column does not appear in list view 320 does not mean that the filter cannot be applied to pull data for list view 320.

Figure 4:
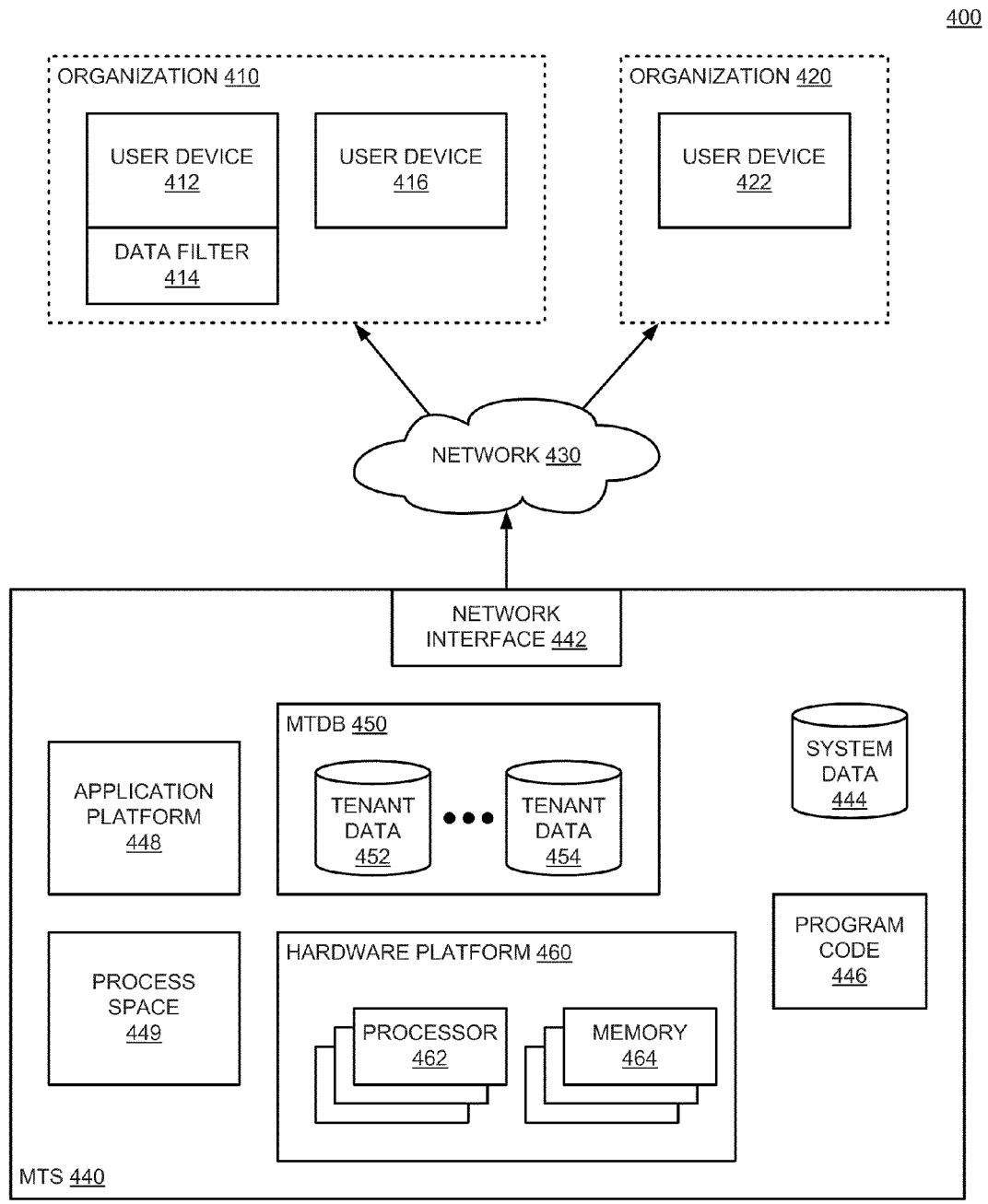
FIG. 4 is a block diagram of an embodiment of an environment for on-demand database services.

FIG. 4 is a block diagram of an embodiment of an environment for on-demand database services. Environment 400 includes components related to an on-demand database service. Environment 400 includes multitenant database system (MTS) 440 and one or more organizations 410 and 420, which are tenants of the MTS. Each organization can include one or more users and/or user devices.

MTS 440 provides on-demand database services for environment 400. An on-demand database service, such provided by MTS 440, is a database system that is made available to an outside user as needed by the user (e.g., on the demand of the user). Thus, a user does not necessarily need to be concerned with building and/or maintaining the database system, and rather can simply store and access data as needed from a remotely operated database system.

In one embodiment, MTS 440 stores information from one or more tenants into tables of a common database image or multitenant database (MTDB) 450. Accordingly, MTS 440 provides on-demand database service. A database image may include one or more database objects. A multitenant database stores data for various different tenants or organizations in a single database instance. Resources (such as memory, processing space, processing hardware, and other resources of the database system) are shared or allocated among the different tenants.

Multitenant database 450 includes tenant data 452, ..., 454. The tenant data may be divided into different storage areas, which can be a physical and/or a logical arrangement of data. In one embodiment, multitenant database 450 is accessed via a relational database management system (RDBMS) or the equivalent, which executes storage and retrieval of information against the database object(s). In one embodiment, multitenant database 450 is accessed via an object-oriented database management system (OODBMS) or the equivalent. In one embodiment, multitenant database 450 is accessed via an object-relational database management system (ORDBMS) or the equivalent. It will be understood that an RDBMS manages data stored in the database based on a relational model, where data and data relationships are stored in tables. An OODBMS includes at least some integration of a database with an object-oriented programming language, and data is stored in the database in the same mode of representation as is provided in the programming language. An ORDBMS implements both a relational model and an object-oriented model, storing data in tables, and allowing representation of data consistent with a programming language.

Application platform 448 represents a framework that allows applications of MTS 440 to execute. Thus, application platform 448 includes the software components (such as an operating system) to allow execution of the applications. Hardware platform 460 provides hardware resources to enable the applications to execute on application platform 448, as well as enabling execution of management or control logic for MTS 440. In one embodiment, application platform 448 of MTS 440 enables creation, managing, and executing one or more applications developed by the provider of the on-demand database service, users accessing the on-demand database service via network 430, or third party application developers accessing the on-demand database service via network 430.

MTS 440 represents any type of system that may provide on-demand database service. In addition to application platform 448 and hardware platform 460, which includes processor resources 462 and memory resources 464, MTS 440 may include other components. MTS 440 includes network interface 442 to enable user devices to access MTS 440 over network 430. In one embodiment, MTS 440 includes system data 444, program code 446, and process space 449. System data 444 represents data specific to the running of MTS 440, rather than being tenant data. It is logically separated from the tenant storage, and may be physically separated (e.g., by designating storage areas or address ranges for system data). Program code 446 represents code to implement various functions of MTS 440, which enable the system to provide on-demand database service. Process space 449 represents a framework for executing MTS processes and tenant-specific processes, such as running applications as part of an application hosting service. Additional processes that may execute on MTS 440 include database indexing processes. It will be understood that MTS 440 may include more or fewer components than what is illustrated.

As mentioned above, environment 400 includes organizations 410 and 420, which represent tenants of MTS 440. Each organization may include one or more individual, and may be an individual or small company, up to a large corporation or organization. Thus, it will be understood that the number of user devices associated with each organization could potentially be hundreds or even thousands. Each organization is assigned a tenant identifier (ID) within MTS 440. Each tenant ID could have certain associated properties for use, depending on how the organization is configured. User device 422 is associated with organization 420, and access MTS 440 under the tenant ID of organization 420. Similarly, user devices 412 and 416 are associated with organization 410, and access MTS 440 under the tenants ID assigned to organization 410.

User devices 412, 416, and 422 may be any machine or system that is used by a user to access a database user system. For example, any of the user devices can be a handheld computing device, a mobile phone, a laptop computer, a work station, and/or a network of computing devices. Each user device can be provided with an on-demand database service from MTS 440 via network 430.

Within an organization, users may be further given access privileges and/or restrictions, as illustrated by data fitter 414. As illustrated, user device 416 may access MTS 440 in accordance with whatever access is available to organization 410, while user device 412 has additional restrictions applied by data filter 414. In one embodiment, data filter 414 may additionally or alternatively provide specific user interface features for user 412 in accessing data from MTS 440.

The users of user devices 412, 416, and 422 may differ in their respective capacities, and the capacity of a particular user device might be entirely determined by permissions (permission levels) for the current user. For example, where a salesperson is using a particular user device to interact with MTS 440, that user device has the capacities assigned to that salesperson. However, an administrator using the same user device may have different capacities assigned to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level. Such enforcement could occur based on data filter 414, which can filter per device and/or could filter for the entire organization (e.g., a central filter as opposed to distributed filtering).

Network 430 represents any network or combination of networks. A network is generically an interconnection of devices that communicate with each other. Network 430 can be or include any combination of a LAN (local area network), WAN (wide area network), telephone network, wireless network, point-to-point network, star network, token ring network, hub network, or other appropriate configuration. TCP/IP (Transfer Control Protocol and Internet Protocol) networks are commonly used, such as the global internetwork of networks often referred to as the "Internet." Reference to specific networks in certain examples herein is meant only to provide examples, and is not limiting.

In one embodiment, user devices 412, 416, 422 (and other user devices not shown) communicate with MTS 440 over network 430 using TCP/IP and, at a higher network level, use other common protocols to communicate, such as HTTP (HyperText Transfer Protocol), FTP (File Transfer Protocol), AFS (Andrew File System—a distributed network filesystem using trusted servers), WAP (Wireless Access Protocol). In an example where HTTP is used, user device 412 might include an HTTP client commonly referred to as a "browser" for sending and receiving HTTP messages to and from an HTTP server at MTS 440 (not specifically shown, but which could be executed on hardware platform 460). Such an HTTP server might be implemented as the sole network interface between MTS 440 and network 430, but other techniques might be used as well or instead. In one embodiment, the interface between MTS 440 and network 430 includes load sharing functionality, such as round-robin HTTP request distributors to balance loads and distribute incoming HTTP requests evenly over a plurality of servers. At least as for the users that are accessing that server, each of the plurality of servers has access to data in MTS 440; however, other alternative configurations may be used instead.

In one embodiment, MTS 440 implements a web-based customer relationship management (CRM) system. For example, in one embodiment, MTS 440 includes application servers configured to implement and execute CRM software applications as well as provide related data, code, forms, webpages and other information to and from user devices (e.g., 412, 416, 422) and to store to and retrieve from a database system related data, objects, and webpage content. With a multitenant system, data for multiple tenants may be stored in the same physical database object; however, tenant data is typically arranged so that data of one tenant is kept logically separate from that of other tenants. The logical separation prevents one tenant from having access to another tenant's data. An express sharing of data among tenants is possible, which removes the logical separation. In one embodiment, MTS 440 implements applications other than or in addition to a CRM application. For example, MTS 440 may provide tenant access to multiple hosted (standard and custom) applications, including a CRM application. User (or third party developer) applications, which may or may not include CRM, may be supported by application platform 448, which manages creation, storage of the applications into one or more database objects and executing of the applications in a virtual machine in process space 449 of MTS 440.

In one embodiment, MTS 440 is configured to provide webpages, forms, applications, data and media content to user (client) device to support the access by user devices as tenants of MTS 440. In one embodiment, MTS 440 provides security mechanisms to keep each tenant's data separate unless the data is shared. More than one MTS may be used. If more than one MTS is used, the multiple systems may be located in close proximity to one another (e.g., in a server farm located in a single building or campus), or they may be distributed at locations remote from one another (e.g., one or more servers located in city A and one or more servers located in city B).

As used herein, each MTS could include one or more logically and/or physically connected servers distributed locally or across one or more geographic locations. Additionally, the term "server" refers to a computer system, including processing hardware and process space(s), and an associated storage system and database application (e.g., OODBMS, RDBMS, ORDBMS) as is known in the art. It will be understood that "server system" and "server" are often used interchangeably herein. Similarly, a database object described herein can be implemented as single databases, a distributed database, a collection of distributed databases, a database with redundant online or offline backups or other redundancies, and might include a distributed database or storage network and associated processing intelligence or logic.

Figure 5:
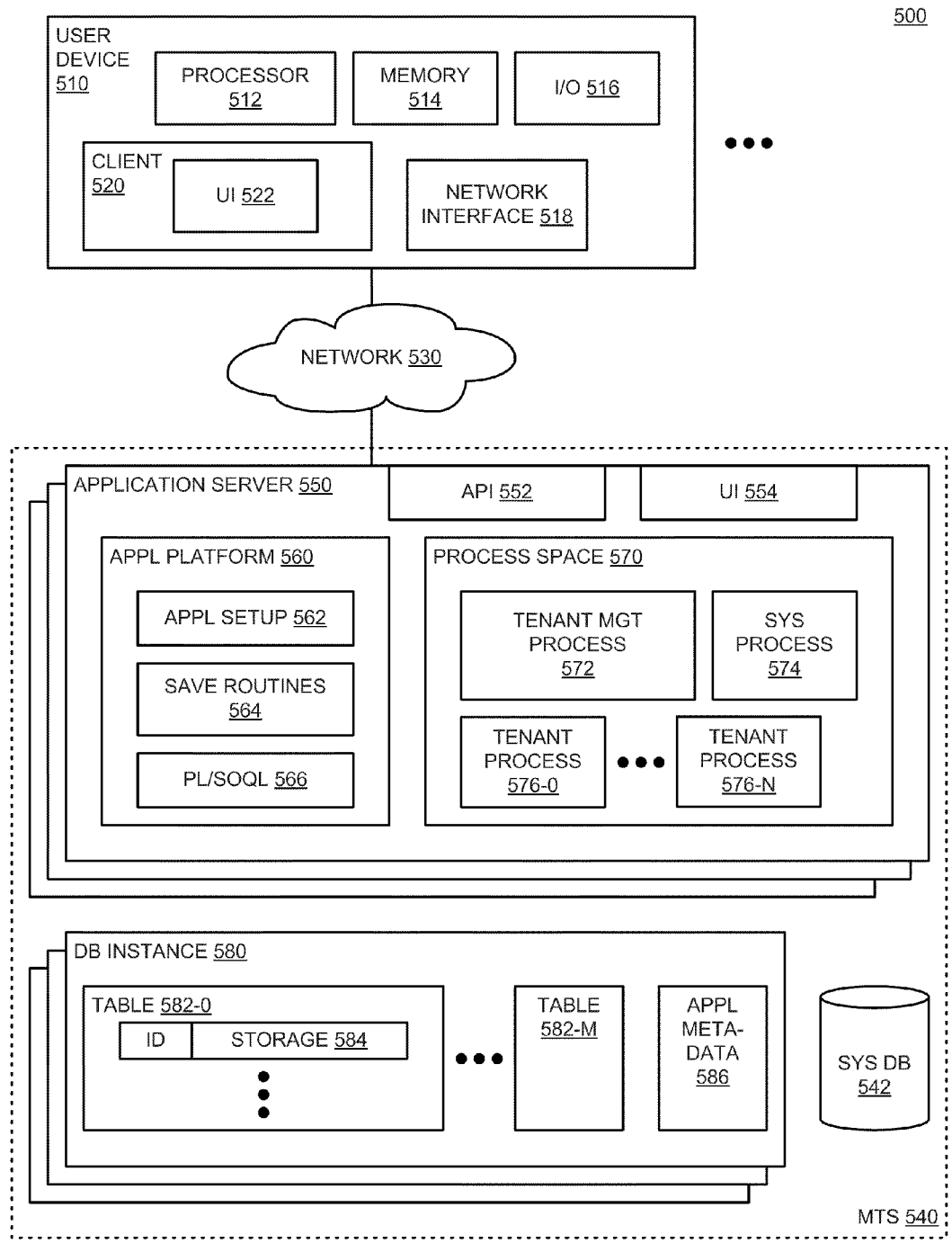
FIG. 5 is a block diagram of an embodiment of an environment for on-demand database services with a multitenant database having multiple data tables.

FIG. 5 is a block diagram of an embodiment of an environment for on-demand database services with a multitenant database having multiple data tables. Environment 500 includes components related to providing an on-demand database service, and may be one example of environment 400 of FIG. 4, with additional components shown. Environment 500 includes one or more multitenant database systems (MTS) 540 and one or more tenants of the MTS, as illustrated by user device 510. User device 510 is generally part of an organization that is the tenant, and user device 510 provides a computing device through which access to MTS 540 is available. MTS 540 provides on-demand database services for environment 500.

Environment 500 may include conventional, well-known elements that are explained only briefly here. For example, user device 510 (and any other user devices through which users access MTS 540) could include a desktop personal computer, workstation, laptop, handheld device, cell phone or smart phone, or any wireless access protocol (WAP) enabled device or any other computing device capable of interfacing directly or indirectly to the Internet or other network connection.

User device 510 includes processor 512, which represents one or more processor devices, and may be any combination of one or more processors. Processor 512 provides hardware means to execute programs and applications on user device 510. Memory 514 represents a memory system for user device 510, and may be any combination of one or more memory devices, short term, and/or long term memory. I/O (input/output) 516 represents any type of input and output devices such as keyboards, pointers and controllers, touchscreens, buttons, microphones, or other input mechanisms, and monitors, screens, printers, interfaces to networks, and/or other output devices.

User device 510 includes network interface 518, which represents hardware interconnections and control logic and circuitry to enable user device 510 to connect to network 530. Network interface 518 also has associated drivers and possibly other software components to allow user programs to interface with the interconnection hardware. User device 510 includes client 520, which represents a program that allows a user of user device 510 to access information from network 530, such as accessing MTS 540. UI 522 represents a user interface component of client 520, or a user interface in which information from client 520 is presented on user device 510. Thus, UI 522 may be integrated with client 520, or it may be separate from client 520, but display data related to the execution of client 520. UI 522 is rendered on display or user interface hardware or device, which can be understood to be represented by UI 522.

In one embodiment, user device 510 runs an HTTP client as client 520. An HTTP client may be, for example, a browsing program or a browser, which may include a WAP-enabled browser in the case of a cell phone, PDA or other wireless device. The HTTP client allows a user (e.g., subscriber of MTS 540) of user device 510 to access, process, and view information, pages, and applications available from MTS 540 over network 530, based on permissions and privileges. The user interface device of user device 510 can be used to access data and applications hosted by MTS 540, and to perform searches on stored data, and otherwise allow a user to interact with various GUI (graphical user interface) pages that may be presented to a user.

Similar to what is discussed above with reference to network 430 of environment 400, network 530 represents any network or group of networks over which access can be provided to MTS 540. Network 530 may include switching and/or routing elements, cables, connectors, and other components. In one embodiment, at least part of network 530 is the Internet, referring to a specific global internetwork of networks. However, it should be understood that other networks can be used in addition to or instead of the Internet, such as an intranet, an extranet, a virtual private network (VPN), a non-TCP/IP based network, any LAN or WAN or other network.

In one embodiment, user devices such as user device 510 (which may be client systems) communicate with application server 550 to request and update system-level and tenant-level data from MTS 540 that may require sending one or more queries to tenant data storage in database instance 580 and/or system data in system database 542. In one embodiment, MTS 540 (e.g., application server 550) automatically generates one or more SQL statements (e.g., one or more SQL queries) designed to access the desired information. System data storage in system database 542 may generate query plans to access the requested data from database instance 580.

In one embodiment, MTS 540 includes one or more application servers 550. From one perspective, application server 550 can be considered a network interface of MTS 540 to connect to network 530. Application server 550 exchanges (i.e., receives and/or transmits) data with network 530, such as receiving requests and sending replies or sending data. Application servers 550 may share hardware resources for interfacing with network 530, or they may be assigned separate resources. In one embodiment, one or more of application servers 550 can be implemented as an HTTP application server.

In one embodiment, each application server 550 is configured to handle requests for any user associated with any organization that is a tenant. Thus, a request from user device 510 could be received and processed at any application server 550. There may be advantages to avoiding affinity for a user and/or an organization or tenant to a specific application server 550, such as the ability to add and remove application servers from a server pool at any time for any reason, as well as for workload balancing among the servers. In an implementation where user and/or tenant affinity is used, an application server could not be removed without completing its jobs and/or handing off users to another server.

In one embodiment, an interface system implementing a load balancing function (e.g., an F5 Big-IP load balancer) is communicably coupled between application servers 550 and the user devices to distribute requests to the application servers 550. In one embodiment, the load balancer uses a least connections algorithm to route user requests to the application servers 550. Other examples of load balancing algorithms, such as round robin and observed response time, also can be used. For example, in certain embodiments, three consecutive requests from the same user could hit three different application servers 550, and three requests from different users could hit the same application server 550. In this manner, MTS 540 is multitenant, wherein MTS 540 handles storage of, and access to, different objects, data, and applications across disparate users and organizations. In one embodiment, Each application server 550 includes elements to provide database access service and request processing. Application server 550 includes API (application programming interface) 552 and UI 554. UI 554 represents server-side components that provide user interface elements that are provided to user device 510 for display. API 552 provides an interface for users and/or developers to access resident processes of MTS 540.

In one embodiment, application server 550 includes application (appl) platform 560, which provides a sub-environment on which applications hosted by application server 550 can be executed. Application platform 560 may include an operating system or other control logic, as well as business logic and common routines for use by the applications. As illustrated, application platform 560 includes application setup mechanism 562 that supports creation and management of applications, including configuration, by application developers, which may be saved as metadata into tenant data storage of database (db) instance 580. Save routines 564 represent the mechanisms used to store data in database instance 580, such as storing the application setup metadata. Such applications can be executed by subscriber users, for example, in process space 570.

In one embodiment, invocations to or related to such applications may be coded using PL/SOQL (Procedural Language Salesforce Object Query Language) that provides a programming language style interface extension to API 552. Thus, PL/SOQL 566 is capable of serving as a procedural extension to an on-demand database centric service API that allows flow control and transaction control to execute on a server in conjunction with database APIs (e.g., SOQL, data manipulation language (DML), or others). PL/SOQL 566 can enable the capability to thread together multiple SOQL/DML statements as a single unit of work on the server. PL/SOQL 566 need not necessarily be considered a general purpose programming language, seeing that it may be implemented as heavily data focused, but is not necessarily implemented that way. In one embodiment, PL/SOQL 566 can be used by developers to interlace with an on-demand database system, in contrast to traditional application developers' conventional tools, such as PL/SQL (Structured Query Language) of ORACLE, Inc. of Redwood Shores, Calif., and others.

In one embodiment, PL/SOQL 566 includes variable and expression syntax, block and conditional syntax, loop syntax, object and array notation, pass by reference, and other syntax known to other programming languages. Thus, full control over syntax and the ability to reference dynamic schema elements is provided with a new language and runtime for database services. Where embedded concepts that interface with on-demand database applications are provided, syntax and semantics that are easy to understand and which encourage efficient use of database APIs may also be employed. In one embodiment, PL/SOQL 566 is implemented as a strong typed language with direct (non-quoted) references to schema objects such as Object and Field names (both standard and custom).

More details about PL/SOQL language embodiments is discussed in commonly owned U.S. Provisional Patent Application 60/828,1192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 4, 2006, now expired, which is incorporated in its entirety.

In one embodiment, invocations to applications may be detected by one or more system processes, which manage retrieving application metadata 586 for the subscriber making the invocation and executing the metadata as an application in a virtual machine. Metadata 586 provides data related to access and/or use of data stored in database instance 580. In one embodiment, metadata is stored in a separate table within database instance 580, and in an alternative embodiment, metadata 586 is stored with other data elements of user storage (such as with user storage 584 of table 582-0.

In one embodiment, application server 550 includes process space 570, which may include tenant process spaces 576-0 through 576-N (for some integer number N of process spaces configured in application server 550), tenant management process space 572 and system process space 574. It will be understood that process space 570 is an abstraction to illustrate the resources allocated for execution of processes (e.g., programs or applications) within application server 550. The skilled reader recognizes that memory and processor and other hardware resources may need to be allocated, as well as software resources to support the execution of a process. The processes may be executed as separate threads, or may share a thread. In one embodiment, the number N of tenant processes is equal to a number of subscriber tenants. In another embodiment, the number N of tenant processes may be higher than the number of subscriber tenants. Tenant management process 572 provides management of the other processes, including determining when certain processes execute. System process 574 executes operations related to functions of MTS 540.

Each application server 550 may be configured to tenant data storage in database instance 580 and the tenant data stored therein, and to system data storage of system database 542 and the system data stored therein to serve requests of user devices. As mentioned above, in one embodiment, tenant data is separated logically, and stored in the same multitenant database. In one embodiment, database instance 580 stores data in tables 582-0 through 582-M, where M is some integer number of tables. In one embodiment, different tables store data of different types. Application metadata 586 may be implemented as a separate table. Alternatively, one of the tables 582-0 through 582-M could be a table that stores varying types of objects, which are defined through metadata stored in the table.

In one embodiment, database instance is further implemented with user storage space distinct (e.g., identifiable) from its associated tenant. Thus, for example, user data may include the tenant ID, as well as an identifier specific to a user. Thus, storage 584 may represent either or both of tenant storage or user storage. For example, a copy of a user's most recently used (MRU) items might be stored to in user storage within database instance 580. Similarly, a copy of MRU items for an entire organization that is a tenant might be stored to a tenant storage area of database instance 580. In one embodiment, the tenant data and the system data (as illustrated by system database 542) are stored in separate databases.

Application servers 550 may be communicably coupled to database systems, e.g., having access to system database 542 and tenant database instance 580, via a different network connection. For example, one application server may be coupled via a network (e.g., the Internet), another application server might be coupled via a direct network link, and another application server might be coupled by yet a different network connection. The application servers may connect to the database systems via TCP/IP or another transport protocol, at least partially depending on the network interconnect used.

Regarding storage in database instance 580, one tenant might be a company that employs a sales force where each salesperson uses MTS 540 to manage their sales process. Thus, a user might maintain contact data, leads data, customer follow-up data, performance data, goals and progress data, and other data, all applicable to that user's personal sales process (e.g., storage 584, which may be tenant storage). Thus, all of the data and the applications to access, view, modify, report, transmit, calculate, or perform other operations can be maintained and accessed via a user device having nothing more than network access. In an example of an MTS arrangement, the user can manage his or her sales efforts and cycles from any of many different user devices. For example, if a salesperson is visiting a customer and the customer has a lobby with Internet access, the salesperson can obtain critical updates as to that customer white waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by MTS 540 that are allocated at the tenant level white other data structures might be managed at the user level. Because MTS 540 may support multiple tenants including possible competitors, MTS 540 should have security protocols that keep data, applications, and application use separate. Additionally, because many tenants may opt for access to an MTS rather than maintain their own system, redundancy, up-time, and backup are additional functions that may be implemented MTS 540. In addition to user-specific data and tenant specific data, MTS 540 may also maintain system level data usable by multiple tenants or other data. Such system level data might include industry reports, news, postings, and the like that are sharable among tenants.

In one embodiment, each database instance 580 can be viewed as a collection of objects, such as a set of logical tables, containing data fitted into predefined categories. A "table" is one representation of a data object, and may be used herein to simplify the conceptual description of objects and custom objects according to what is described herein. It should be understood that "table" and "object type" may be used interchangeably herein. Each table generally contains one or more data categories logically arranged as columns or fields in a viewable schema. Each row or record of a table contains an instance of data for each category defined by the fields.

For example, a CRM database may include a table that describes a customer with fields for basic contact information such as name, address, phone number, fax number, or other information. Another table might describe a purchase order, including fields for information such as customer, product, sale price, date, or other fields. In one embodiment, a multitenant database has standard entity tables for use by all tenants. For CRM database applications, such standard entities might include tables for Account, Contact, Lead, and Opportunity data, each containing pre-defined fields. Thus, tables 582-0 through 582-M may include standard, defined tables.

In one embodiment, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", teaches systems and methods for creating custom objects as well as customizing standard objects in a multitenant database system. In one embodiment, for example, all custom entity data rows are stored in a single multitenant physical table, which may contain multiple logical tables per organization. It is transparent to customers that their multiple "tables" are in fact stored in one large table or that their data may be stored in the same table as the data of other customers.

Figure 6:
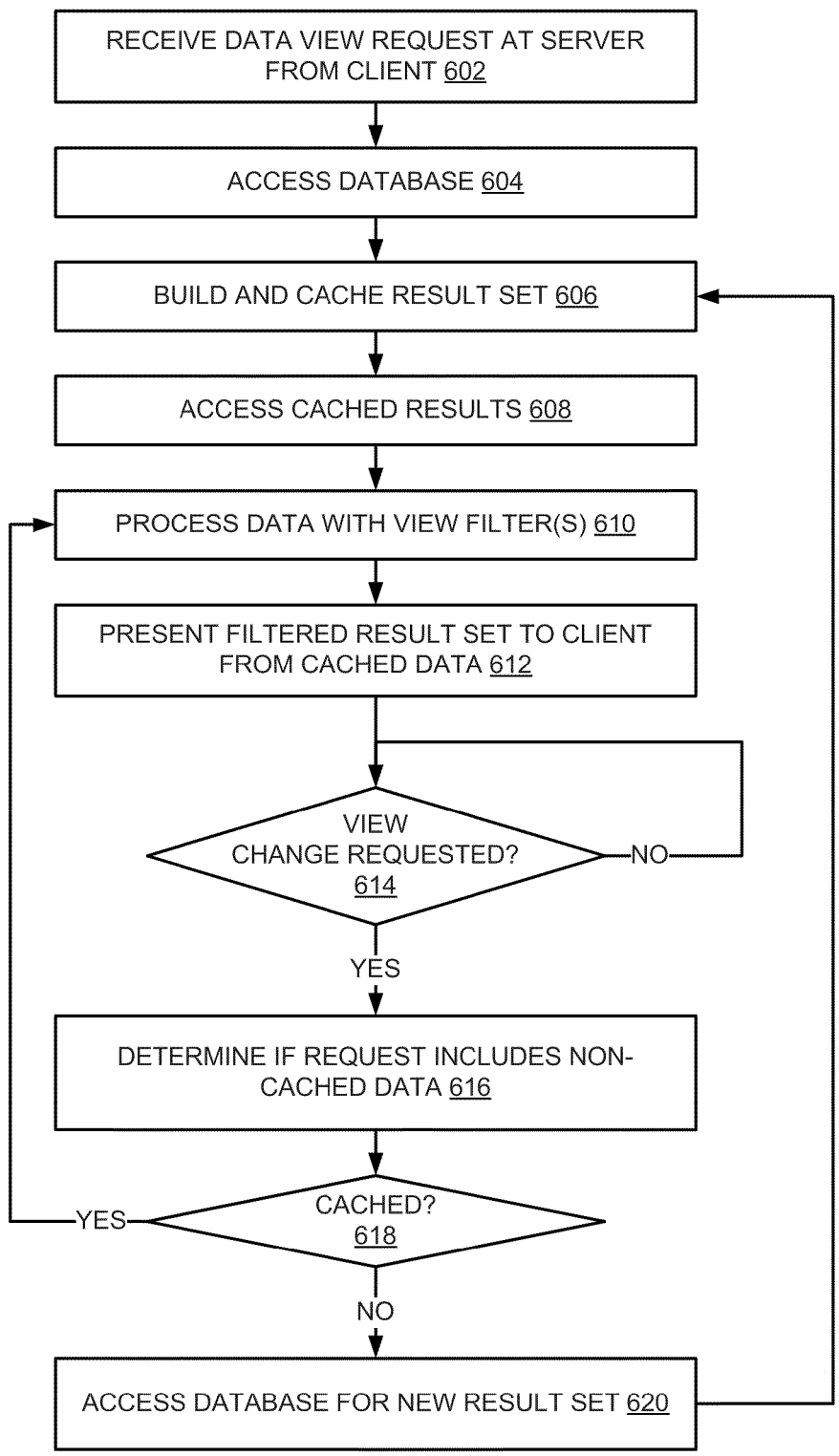
FIG. 6 represents a flow diagram of an embodiment of interactive data filtering for remote database access.

FIG. 6 represents a flow diagram of an embodiment of interactive data filtering for remote database access. Flow diagrams as illustrated herein provide examples of sequences of various process actions. Although shown in a particular sequence or order, unless otherwise specified, the order of the actions can be modified. Thus, the illustrated implementations should be understood only as an example, and the process can be performed in a different order, and some actions may be performed in parallel. Additionally, one or more actions can be omitted in various embodiments; thus, not all actions are required in every implementation. Other process flows are possible.

A server of a database system receives a data view request from a client device over a network, 602. The server accesses the database, 604, and builds and caches a result set, 606, from the data returned in response to the query. The caching occurs in a memory local to the server and remote from the client device. For building a view to present to the client, the server accesses the cached results, 608.

In one embodiment, the server applies one or more view filters set by the user on the result set to determine what data to use to populate the view. Thus, the server processes the result set for data in accordance with one or more view filter requests, 610. The server presents the filtered cached result set data to the client, 612.

The server can then monitor for interaction by the user. If a view change is not requested by the user, 614, the server will continued to monitor. If a view change is request, 614, the server determines if the request includes non-cached data, 616. In one embodiment, certain interactions always result in the server querying the database again without having to make any specific determinations. In one embodiment, the server may compare a breadth of the current request to a previous request to see if the results are outside the scope of what is cached.

If the data is not cached, 618, the server accesses the database for a new result set, 620. Then the server builds the result set, 606, and proceeds as described above. If the data is cached, 618, the server generates a new filtered results set for the changed view from the cached data by returning to processing the results set based on the requested filters, 610, and continues as described above.

Figure 7:
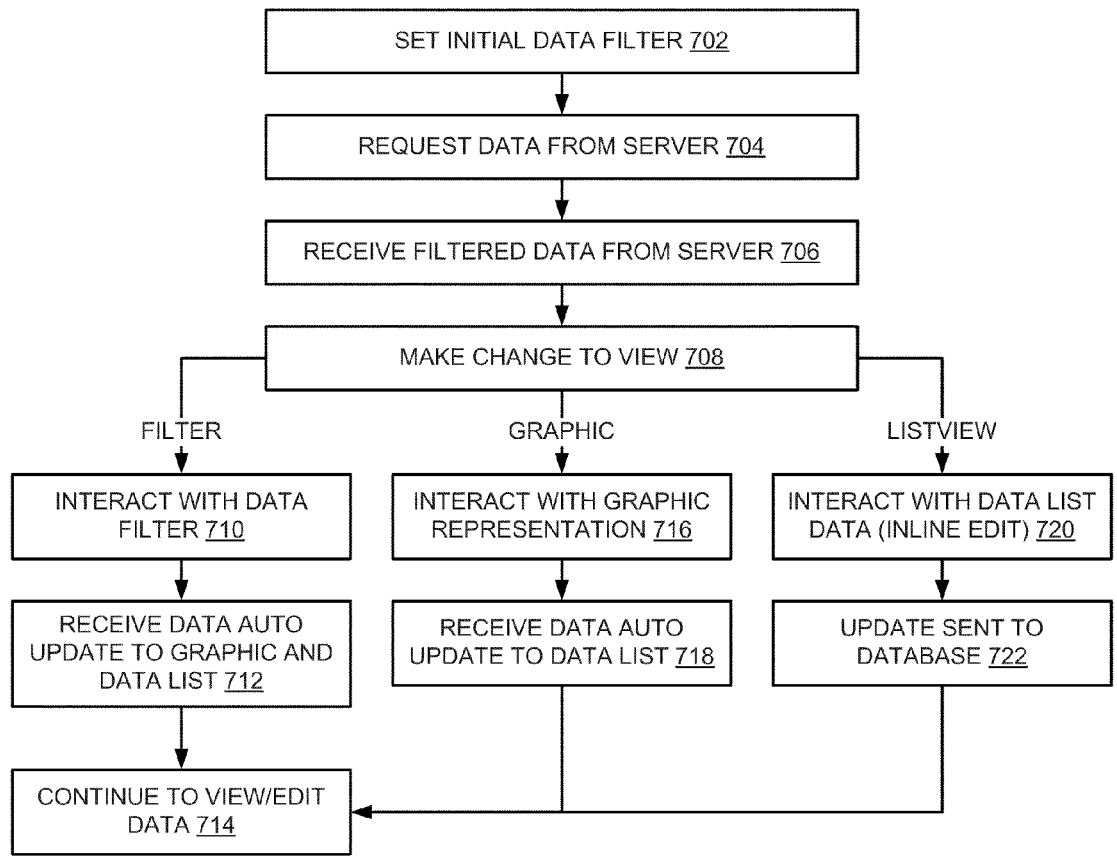
FIG. 7 represents a flow diagram of an embodiment of client-side data filter requests for a view of remote database access.

FIG. 7 represents a flow diagram of an embodiment of client-side data filter requests for a view of remote database access. At a client side of a view with an interactive filter, the user can perform various interactions that cause an automatic and potentially near-real-time change to viewed data. The client application has an initial set of data filters, 702, for the server to apply to the result set. The initial filter setting may occur by default for an organization or a user. The initial filter setting could be as a result of a saved template or view form for a user. The initial filter setting could be set on the initial query by the user.

The client device requests data from the server based on a request by a user, 704. The client device then receives filtered data from the server in response to the request, 706. The view is interactive, which allows the user to make desired changes to the view. If the user does make a change to the view, 708, the change can be requested in one of multiple ways.

In one embodiment, the user makes a change by setting parameters of one or more available filters. In such a case, the client indicates to the server a modification of a data filter from a filter list in response to user interaction, 710. The server then filters the presented data by either processing cached data, requesting new data from the database in the case that a filter request is outside the cached results, or both. The client then receives an automatic data update to any displayed graphics and the data list view, 712. The client application then allows the user to continue to view and edit data from the presentation, 714.

In one embodiment, the user makes a change by interacting with a graphic representation, 716. The interacting may be by a user clicking on something on the graphic, performing a mouse-over of the graphic, selecting something from a toolbar, or some other interaction. The server then filters the presented data by processing cached data. It is expected that most user interactions with a graphic could be satisfied solely with access to the cached data. However, in one embodiment, it is possible for an interaction to be available that would be outside the cached results, which would cause the server to make a query to the database. The client then receives an automatic data update to the data list view from the server in response to the filtering of the data, 718. The client application then allows the user to continue to view and edit data from the presentation, 714.

In one embodiment, the user makes a change by interacting with the list view, 720. Interaction of the user with the list view is typically in the form of an inline edit. The client then sends an update request to the server for the server to apply the data changes to the database, 722. The client application then allows the user to continue to view and edit data from the presentation, 714.

Various operations or functions are described herein, which may be described or defined as software code, instructions, configuration, and/or data. The content may be directly executable ("object" or "executable" form), source code, or difference code ("delta" or "patch" code). The software content of the embodiments described herein may be provided via an article of manufacture with the content stored thereon, or via a method of operating a communications interface to send data via the communications interface. A machine readable medium or computer readable medium may cause a machine to perform the functions or operations described, and includes any mechanism that provides (i.e., stores and/or transmits) information in a form accessible by a machine (e.g., computing device, electronic system, or other device), such as via recordable/non-recordable storage media (e.g., read only memory (ROM), random access memory (RAM), magnetic disk storage media, optical storage media, flash memory devices, or other storage media) or via transmission media (e.g., optical, digital, electrical, acoustic signals or other propagated signal). A communication interface includes any mechanism that interfaces to any of a hardwired, wireless, optical, or other medium to communicate to another device, such as a memory bus interface, a processor bus interface, an Internet connection, a disk controller. The communication interface can be configured by providing configuration parameters and/or sending signals to prepare the communication interface to provide a data signal describing the software content.

Various components described herein may be a means for performing the operations or functions described. Each component described herein includes software, hardware, or a combination of these. The components can be implemented as software modules, hardware modules, special-purpose hardware (e.g., application specific hardware; application specific integrated circuits (ASICs), signal processors (DSPs), etc.), embedded controllers, hardwired circuitry, etc.

Besides what is described herein, various modifications may be made to the disclosed embodiments and implementations without departing from their scope. Therefore, the illustrations and examples herein should be construed in an illustrative, and not a restrictive sense.

What is claimed is:

1. A system comprising:
    a database including hardware and software components to implement a database;
    a cache memory device local to the database, and remote from a client device;
    a server implemented on hardware components local to the database to store a query result set on the cache memory device as a cached result set obtained in response to a user query, the server to
        access the cached result set, the result set including multiple rows of data each having columns representing fields of the data;
        present a portion of the result set including selected rows of the multiple rows in a list view to the client device remote from the server and the cache memory, the portion based on filter selection that generates a filtered result set of rows of data based on fields of the data;
        receive a change to the filter selection from the client device; and
        dynamically alter the list view based on the changed filter selection, wherein in response to the changed filter selection requesting a row of data not cached in the memory, generating a new query on the database for a new result set including the requested row of data, cache the new result set, and generate an updated filtered result set of rows of data based on fields of the data from the new result set, and otherwise, generate an updated filtered result set of rows of data based on fields of the data from the cached result set without generate a new query on the database.

2. The system of claim 1, wherein the server applies a limit to the number of rows stored in cache memory device.

3. The system of claim 1, further comprising the server to access a metadata description from the database to define a mapping between the columns of the rows of data and the fields of the data in the database.

4. The system of claim 1, further comprising the server to present an interactive graphic representation of the result set to the client device, wherein receive the change to the filter selection comprises receive a request from the client device via the interactive graphic representation.

5. The system of claim 1, further comprising the server to present a filter list having filters corresponding to fields of the data, wherein receive the change to the filter selection comprises receive the change from the client device via the filter list.

6. The system of claim 1, further comprising the server to receive an inline edit made in the list view; and
    apply the edit to the database.

7. The system of claim 1, wherein the database comprises a multitenant database that stores data for multiple client organizations each identified by a tenant identifier (ID) and one or more users are associated with the tenant ID, wherein the one or more users of each client organization accesses data identified by the tenant ID associated with the respective client organization, and wherein the multitenant database is hosted by an entity separate from the client organization.

8. The system of claim 7, further comprising the server to store the cached result set in a shared memcache of the multitenant database; and
    apply a timeout to the cached result set to prevent the cached result set from consuming an excessive amount of resources of the multitenant database.

9. A method comprising:
    accessing with a server a cached result set of a query on a database, the result set including multiple rows of data each having columns representing fields of the data, the result set being cached in a memory local to the server;
    presenting a portion of the result set including selected rows of the multiple rows in a list view to a client device remote from the server and the memory, the portion based on filter selection that generates a filtered result set of rows of data based on fields of the data;
    receiving at the server a change to the filter selection from the client device; and
    dynamically altering the list view based on the changed filter selection, wherein
        in response to the changed filter selection requesting a row of data not cached in the memory, generating a new query on the database for a new result set including the requested row of data, caching the new result set, and generating an updated filtered result set of rows of data based on fields of the data from the new result set, and otherwise,
generating an updated filtered result set of rows of data based on fields of the data from the cached result set without generating a new query on the database.

10. The method of claim 9, further comprising:
accessing a metadata description from the database to define a mapping between the columns of the rows of data and the fields of the data in the database.

11. The method of claim 9, further comprising:
presenting an interactive graphic representation of the result set, wherein receiving the change to the filter selection comprises receiving a request via the interactive graphic representation.

12. The method of claim 9, further comprising:
presenting a filter list having filters corresponding to fields of the data, wherein receiving the change to the filter selection comprises receiving the change via the filter list.

13. The method of claim 9, further comprising:
receiving an inline edit made in the list view; and
applying the edit to the database.

14. The method of claim 9, wherein the database comprises a multitenant database that stores data for multiple client organizations each identified by a tenant identifier (ID) and one or more users are associated with the tenant ID, wherein the one or more users of each client organization accesses data identified by the tenant ID associated with the respective client organization, and wherein the multitenant database is hosted by an entity separate from the client organization; and further comprising:
storing the cached result set in a shared memcache of the multitenant database; and
applying a timeout to the cached result set to prevent the cached result set from consuming an excessive amount of resources of the multitenant database.

15. An article of manufacture comprising a non-transitory computer readable storage medium having content stored thereon, which when executed, cause a machine to perform operations including:
accessing with a server a cached result set of a query on a database, the result set including multiple rows of data each having columns representing fields of the data, the result set being cached in a memory local to the server;
presenting a portion of the result set including selected rows of the multiple rows in a list view to a client device remote from the server and the memory, the portion based on filter selection that generates a filtered result set of rows of data based on fields of the data;
receiving at the server a change to the filter selection from the client device; and
dynamically altering the list view based on the changed filter selection, wherein
in response to the changed filter selection requesting a row of data not cached in the memory, generating a new query on the database for a new result set including the requested row of data, caching the new result set, and generating an updated filtered result set of rows of data based on fields of the data from the new result set, and otherwise,
generating an updated filtered result set of rows of data based on fields of the data from the cached result set without generating a new query on the database.

16. The article of manufacture of claim 15, further comprising content to provide instructions for
accessing a metadata description from the database to define a mapping between the columns of the rows of data and the fields of the data in the database.

17. The article of manufacture of claim 15, further comprising content to provide instructions for
presenting an interactive graphic representation of the result set, wherein receiving the change to the filter selection comprises receiving a request via the interactive graphic representation.

18. The article of manufacture of claim 15, further comprising content to provide instructions for
presenting a filter list having filters corresponding to fields of the data, wherein receiving the change to the filter selection comprises receiving the change via the filter list.

19. The article of manufacture of claim 15, further comprising content to provide instructions for
receiving an inline edit made in the list view; and
applying the edit to the database.

20. The article of manufacture of claim 15, wherein the database comprises a multitenant database that stores data for multiple client organizations each identified by a tenant identifier (ID) and one or more users are associated with the tenant ID, wherein the one or more users of each client organization accesses data identified by the tenant ID associated with the respective client organization, and wherein the multitenant database is hosted by an entity separate from the client organization; and further comprising content to provide instructions for
storing the cached result set in a shared memcache of the multitenant database; and
applying a timeout to the cached result set to prevent the cached result set from consuming an excessive amount of resources of the multitenant database.

* * * * *